US008827155B2

(12) United States Patent
Kocznar et al.

(10) Patent No.: US 8,827,155 B2
(45) Date of Patent: Sep. 9, 2014

(54) ACCESS CONTROL GATE

(75) Inventors: Wolfram Kocznar, Innsbruck (AT); Josef Fischer, Hallein (AT)

(73) Assignee: Axess AG, Salzburg/Anif (AT)

( * ) Notice: Subject to any disclaimer, the term of this patent is extended or adjusted under 35 U.S.C. 154(b) by 405 days.

(21) Appl. No.: 13/293,851

(22) Filed: Nov. 10, 2011

(65) Prior Publication Data

US 2013/0120108 A1 May 16, 2013

(51) Int. Cl.

| | |
|---|---|
| ***G06K 5/00*** | (2006.01) |
| ***B60R 25/00*** | (2013.01) |
| ***H02P 1/00*** | (2006.01) |
| ***E05F 15/20*** | (2006.01) |
| ***E06B 11/08*** | (2006.01) |

(52) U.S. Cl.

CPC ............. *E05F 15/203* (2013.01); *E06B 11/085* (2013.01); *E05F 15/2046* (2013.01)

USPC ................ 235/382; 49/340; 49/139; 340/5.7; 318/282; 318/470; 318/266

(58) Field of Classification Search

CPC .......................... E06B 11/085; G07C 9/00007

USPC .............. 340/5.7; 318/282, 470, 266; 49/340, 49/139, 381, 31, 49; 235/382, 375, 380; 292/254

See application file for complete search history.

(56) References Cited

U.S. PATENT DOCUMENTS

| | | | | |
|---|---|---|---|---|
| 3,742,647 | A | 7/1973 | Tomita | |
| 6,012,252 | A | 1/2000 | Kocznar et al. | |
| 6,634,557 | B2 | 10/2003 | Kocznar et al. | |
| 7,513,423 | B2 | 4/2009 | Kocznar et al. | |
| 8,079,515 | B2 | 12/2011 | Kocznar et al. | |
| 2002/0070276 | A1 | 6/2002 | Kocznar et al. | |
| 2002/0117543 | A1 | 8/2002 | Kocznar et al. | |
| 2004/0030568 | A1 | 2/2004 | Kocznar et al. | |
| 2006/0027649 | A1 | 2/2006 | Kocznar et al. | |
| 2009/0032585 | A1 * | 2/2009 | Kocznar et al. | 235/382 |

FOREIGN PATENT DOCUMENTS

| | | |
|---|---|---|
| AT | 297/2007 | 5/2007 |
| GB | 2295297 A | 5/1996 |
| WO | WO 97/18379 | 5/1997 |

* cited by examiner

*Primary Examiner* — Steven Lim
*Assistant Examiner* — Omeed Alizada
(74) *Attorney, Agent, or Firm* — Henry M Feiereisen LLC

(57) ABSTRACT

An access control gate with a mechanical guide forms one or more access lanes for patrons. A contactless access reader which is connected to a software controlled verification system identifies access right of patrons shortly before the person approaches a gate threshold formed by two motor driven flaps which when closed protrude into the access lane from left and right of the lateral lane boundaries. A verification system activates the flaps when an access right has been granted. Two or more photoelectric barriers define a detection zone behind the gate threshold and detect the passage of patrons through the gate threshold and the exit of the detection zone. The flaps are closed with highest possible speed after the patron has left the detection zone regularly, and are moved with low speed if an irregular passage is detected.

3 Claims, 7 Drawing Sheets

ACCESS CONTROL GATE

BACKGROUND OF THE INVENTION

The present invention relates to an access control gate with mechanical guidance to form one or more access lanes for patrons. First electronic means identify the access right of patrons and comprise a contact less RFID-reader which is connected to a software controlled verification system. Second means indicate the approaching patron the access right verification.

DESCRIPTION OF THE RELATED ART

Access control gates have been known in different applications such as ski lift entrance, metro stations, public places and buildings. Most of the time a ticket media like as a magnetic stripe card, a barcode ticket or a RFID-transponder is used to identify the access right, also biometric recognition systems have been used like fingerprint or face recognition. These access control gates comprise electronic means to verify the access right. A barrier closes the access lane and is automatically opened after the access right is verified.

WO 97/18379 describes a typical access control gate used for ski lifts. This gate uses a turnstile as a barrier to close the lane. The means to verify the access right comprise a magnetic stripe reader and/or a reader for contactless RFID cards. After the access right has been verified, the turnstile is released to allow the passage of the skier. To reduce the troubles for the skier it is proposed, that only one arm instead of 3 arms in conventional turnstiles should be used, which arm turns to the bottom to free the lane.

U.S. Pat. No. 3,742,647 describes a gate equipment to be used in railway stations. An access lane is formed by two sidewalls, in each of the sidewalls a flap is hinged and can be turned from a closed position—constricting the lane—to an open position parallel and inside the sidewalls. The flaps are retracted activated after a fare ticket has been verified.

Another example is the GB 2 295 297 which describes a non contacting IC card system and gate facility. To enhance the comfort of a passage two antennas per lane are installed, the first antenna on one side is a transmitter to provide power to the IC card and the second antenna on the other side is a receiver to read the IC card. After an access right have been verified, flaps which are hinged to the sidewalls of the lane open and allow the passage of the patron.

SUMMARY OF THE INVENTION

Access control gates as described before have only been used in environments with perpetual use like public transport. This is because inexperienced patrons have problems to understand the procedure to pass the gate and therefore delay the passenger flow rate or cannot pass without assistance. Additionally turnstile barriers often hook into patrons baggage or cloths and create hassles.

It is an object of the invention to provide an access control gate with a high throughput, without creating any hassle to operator and patrons.

The access control gate comprises two motor driven flaps which protrude from left and right of the lateral lane boundaries into the access lane thereby forming a closed gate threshold, with a contactless access reader arranged to capture the access right of the approaching patron short before he approaches the gate threshold, that verification system activates the flaps when an access right has been approved to swing out of the lane in the approach direction to indicate to the approaching patron the granted access right, and with means to detect the passage of a patron through the gate threshold comprising two or more photoelectric barriers having first and second spaced detecting beams that are directed to the lane zone behind the gate threshold, thereby initiating the flaps to close the lane immediately with high speed behind the patron when he has regularly passed the gate.

The invention supports a flawless passage and patron behaviour. The closed flaps slow down the approaching patron short before arriving at the gate threshold, allowing the contactless access reader to capture the access right. The software controlled verification system activates the flaps to swing out of the lane indicating the patron the granted access right and even inexperienced patrons pass the threshold without stopping. Due to the fact that the flaps free the lane the patron will pass without any restriction and hassle. The photoelectric barriers detect the patrons passage through the threshold and close the flaps immediately behind to prevent any unauthorized passage of a successive patron but mask any unintentional detection of one of the sensors. This access control gate is especially suited to control the entrance at ski lifts.

In a preferred embodiment the access control gate includes upright supports situated at the gate threshold left and right of each lane, which supports are attached to an overhead gantry style beam. The gantry style beam is pivotally mounted on one side to a vertical post to turn away the whole gate assembly from the access lanes. This allows to groom the lane area and to adjust the height of the equipment.

Preferably bearings are mounted on the upright support to pivot each flap on a upright axis, and with a gearbox to turn the flaps from the closed to the open position and vice versa, with a position sensor to detect the open and the closed position of the flaps, and with two or more photoelectric barriers to detect the passage of the patron but to blank out the unintentional screening of only one of the photoelectric barriers before the patron really could pass the threshold.

The contactless access reader is preferably built with first electronic means comprising a RFID antenna on the left side and on the right side of the lane, forming overlapping reading zones to cover the whole lane width, which antennas are attached to the upright supports and which supports are attached to an overhead gantry style beam. Each RFID antenna is formed by an inductive loop with a width of 5 to 15 inch in direction of the lane, arranged parallel at the lane boundaries adjacent to the flap hinges.

To secure safety and security for the patrons it is of special advantage that a gear box includes a electrical motor driving a worm gear pitched near to a self-locking condition, thereby allowing the motor to drive the flaps with low torque but retard the flaps against manual opening with high torque.

DETAILED DESCRIPTION OF A PREFERRED EMBODIMENT

Figure 1:
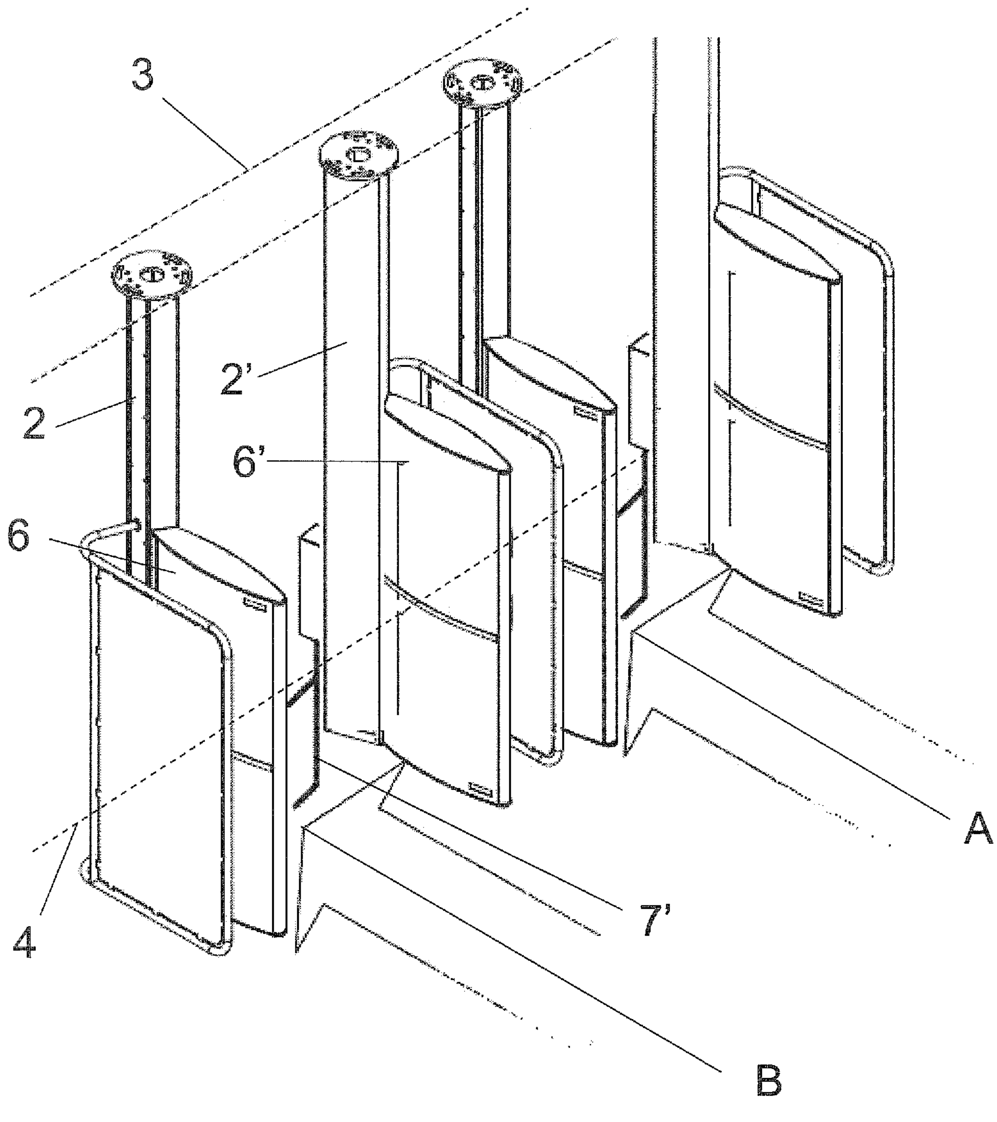
FIG. 1 shows a slanted schematic view of an access control gate with two lanes.

FIG. 1 shows an access control gate especially suited for a ski lift entrance. In this example the gate comprises two lanes named A and B, which are about 30 inches wide to allow patrons to pass with comfort but prevent the passage of two patrons side by side. The lane boundaries are built from upright supports 2 and 2', which are overhead mounted on a gantry style beam 3. The gantry style beam 3 is attached on one side to a vertical post 5 founded into the ground, which can be seen in FIG. 2. The whole gate assembly can therefore be turned away from the lanes to allow cleaning and preparation of the ground. This is a special advantage for ski lift entrance so that the ground can be groomed after the day. Another advantage is that the whole gate assembly can be height adjusted in case of snowfall.

A threshold 4 is formed by flaps 7 and 7', hinged on a vertical axis on the supports 2 and 2' and protruding into the lane A and B. Each flap 7 is mounted on a gear box 8 and 8', which can pivot the flap 7 from the closed position protruding into the lane in an open position parallel outside the lane.

Figure 2:
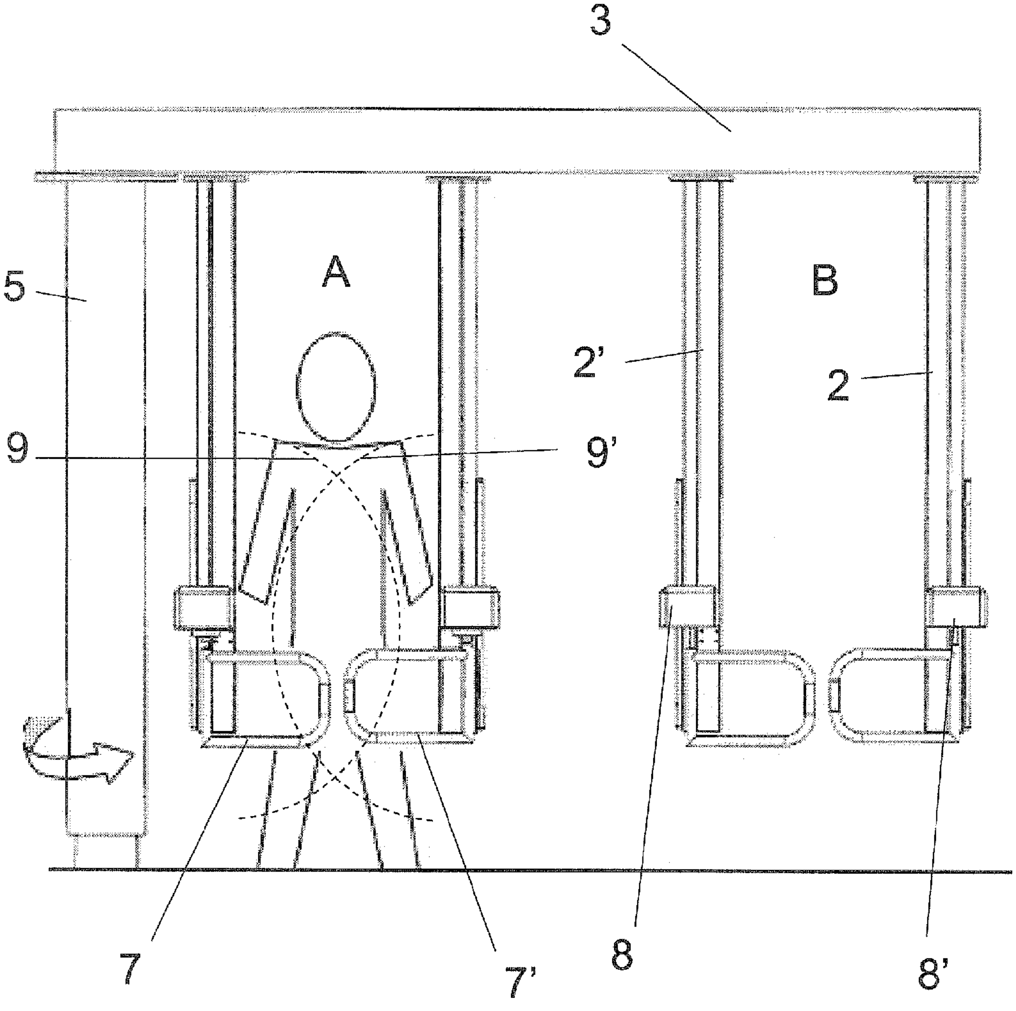
FIG. 2 shows the front view of an access control gate.

The supports 2 and 2' carry RFID-antennas 6 and 6', which comprise inductive loops parallel to the lane with a dimension of about 2 to 4 inches height and 1 to 2 inches width. These inductive loops are connected to RFID-modules shown in FIG. 4 which provide radio wave energy to the loops and which receive signals sent from RFID tickets or chip cards 21 brought into the reading range. The reading zones of the antennas 6 and 6' are shown in FIG. 2 with dotted lines 9 and 9° and are overlapping, so that the whole width of the lane is covered.

Figure 3:
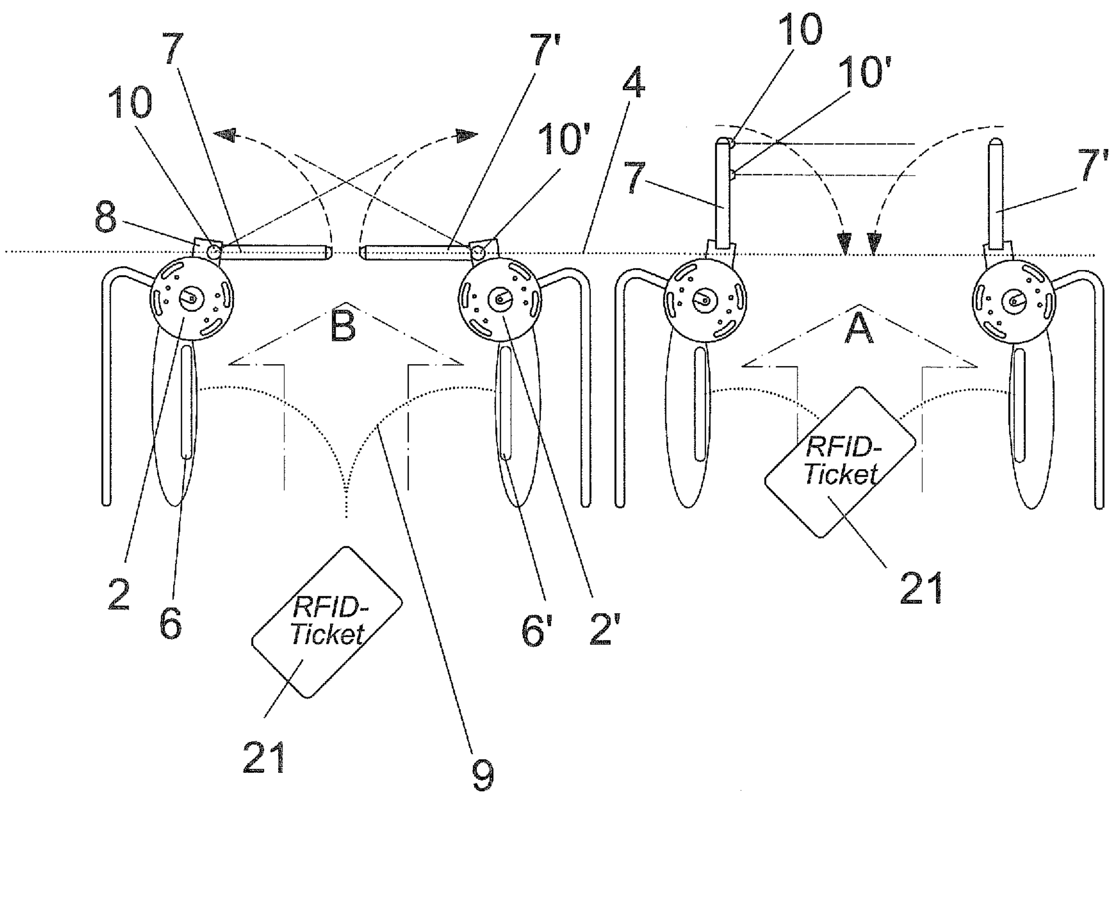
FIG. 3 shows a schematic top view of that gate.

The gate configuration is described more in detail in FIG. 3. The left lane B shows the position of a RFID ticket or chip card 21 from an approaching patron. This RFID ticket or chip card 21 is still out of the reading zone shown with dotted lines 9, 9' of the antennas 6, 6', the flaps 7,7' are closed thereby forcing the inexperienced patron to slowdown. When the patron reaches the reading zone the RFID ticket or chip card 21 is captured, the access right is verified and the flaps 7, 7' are opened. This situation is shown in lane A. The antennas are adjacent to the flaps hinges mounted on the supports 2 and have a dimension of about 10 inch width in direction of the lane, the height of the antenna loop is about 30 inches not shown in this figure. The reading zone shall be near to the gate threshold 4 to assure that a RFID ticket or chip card 21 is captured independent from the ticket orientation but during the approach or when arrived between the antennas. As a result before the approaching patron stops his arrival the flaps 7, 7' open and indicate very clear that a passage of the gate is possible. The lane is full open and no hassle even with bags or clothes appear.

Furthermore the lane B of FIG. 3 shows means to detect the passage of a patron through the gate threshold 4. This means comprise a first photoelectric barrier 10 and a second photoelectric barrier 10'. Both are mounted on the supports 2 and the detection beams are directed to the lane B behind the gate threshold 4 with a distance to each other. Both detection beams are masked by the patron when passing the threshold 4 and the closing of the flaps 7, 7' is initiated. This configuration assures that a passage of a second patron without a valid ticket behind is prevented and that an unintentional closing is prevented too. Especially skiers have their ski poles in front of the body and this ski poles should not initiate a closing.

The lane A shows a different location to mount the photoelectric barriers. The photoelectric barriers 10 and 10' are mounted with different distance to the flap axis on one of the flaps 7. With open flaps 7 shown in this lane A the detection beams have a spacing of about 3 inch in direction of the lane. To close the flaps 7 both detection beams have to be masked by the patron, the unintentional masking of one of the beams with a ski pole do not initiate the closing.

Figure 4:
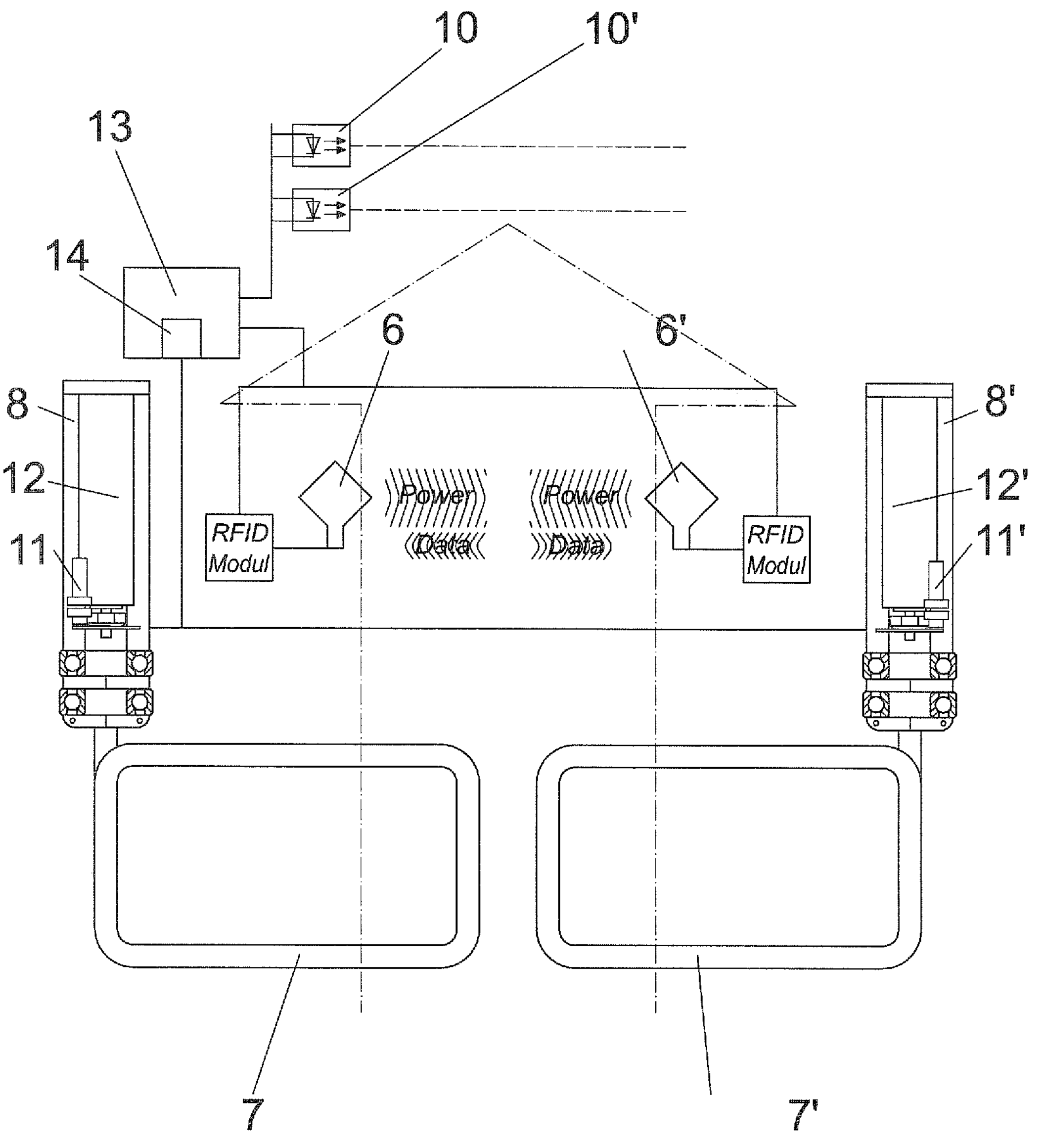
FIG. 4 shows the functional units of the gate.

FIG. 4 shows the invention with functional blocks. The gear boxes 8 and 8' are situated left and right of the lane A and comprise an electrical motor 12 and 12' which is controlled by an electronic flap control unit 14 as a part of the verification system 13. This flap control unit 14 furthermore evaluates the positions sensors 11 and 11' to know the flap condition closed, open or moving and evaluates the photoelectric barriers 10 and 10' to detect the position of a passing patron.

A special gear box not shown in detail for the flaps 7, 7' uses a DC-motor driving a worm gear. The worm gear may be near to self locking adjusted but it should not reach a self locking status. This gear box allows to drive the flaps 7, 7' with low torque for a safe passage of patrons. The worm gear secures a high torque if a patron without access verification to move opens the flaps. Additionally a magnetic brake may be added to the flap drive to enhance the holding torque.

Both antennas 6, 6' situated left and right of the lane A are connected to RFID-modules and serve as transmitter/receiver for radio waves. This contactless access reader operates in the 13.56 MHz band and creates a reading zone for RFID transponders near to the gate threshold not shown in this figure covering the whole lane width. The invention may also use other contactless access reader systems.

The RFID modules are connected to a verification system 13 which receives signals from the antennas 6 and verifies the access right. If an access right has been granted to a certain RFID ticket or chip card 21, the verification system 13 sends an open signal to the gate control unit 14. A gate control unit is provided for each of the flaps 7 and 7'. The gate control unit 14 provides power to the motor 12, 12', which is mechanically connected to the respective flap 7, 7'. This forces the flap 7, 7' to turn out of the lane A until the position sensor 11, 11' indicates reaching the final position of the flap 7, 7' parallel to the lane A. The patron holding the RFID ticket or chip card 21 passes the gate threshold 4 and masks now the first photoelectric barrier 10 and short after the second photoelectric barrier 10'. The logic of the verification system 13 assures that both detection beams of the barriers 10 and 10' must be masked to prevent an unintentional closing e.g. with a preceding bag or ski stock. The photoelectric barriers 10 are situated in a way that a closing signal is derived immediately when the patron leaves the threshold 4. The gate control units 14 then close the flaps 7, 7' for the next patron. It may be of advantage to integrate a function called fast following which keeps the flaps open if the next patron already has been verified.

Figure 5:
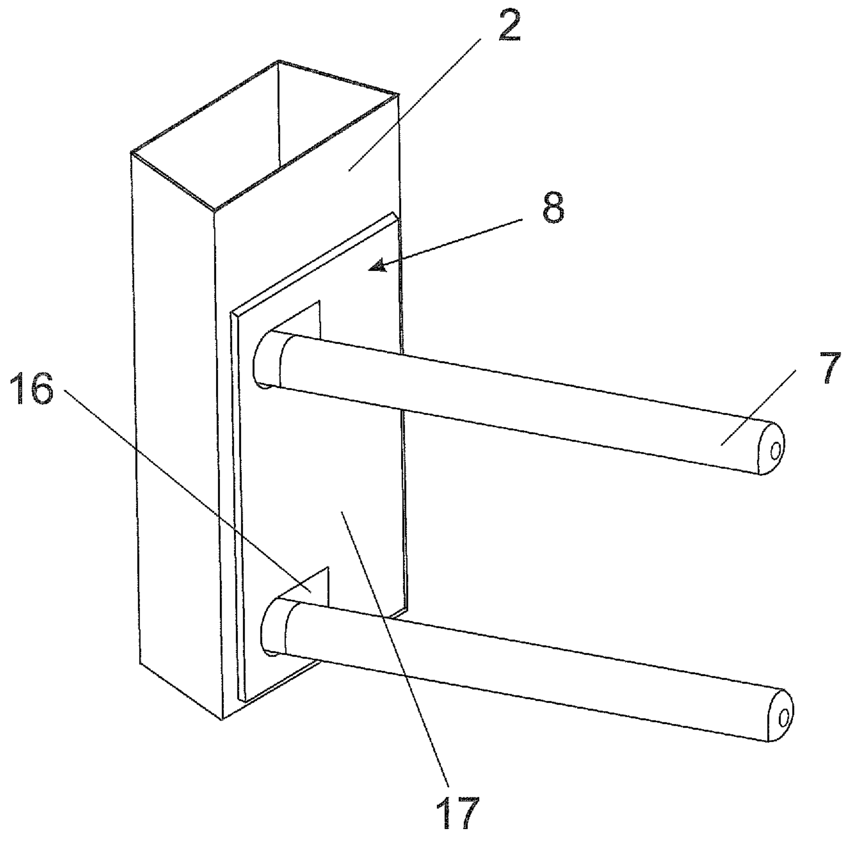
FIG. 5 shows a cross section of a preferred gearbox for the flaps.

FIG. 5 shows a cross section of a preferred gearbox 8 for the flaps 7, 7'. This gearbox 8 fits into a module hole of the support 2. A bearing plate 17 forms the cover of the gearbox. A lever 18 shaped as a quarter of a circle is mounted in its centre on a vertical axis 15 on the inner side of the bearing plate 17. This lever 18 can be turned from a position inside the gearbox to a position outside thereby breaking through an accordingly shaped hole 16 in the bearing plate 17. On one radial end of the lever 18 the flap 7 is mounted. This gearbox allows turning the flap 7 from a closed position (protruding into the lane) into an open position parallel to the lane. The design results in a minimum of space requirement and allows a slot between the open flap 7 and the bearing plate 17 to prevent any seizing of fingers of a passenger during the passage of the lane.

Figure 6:
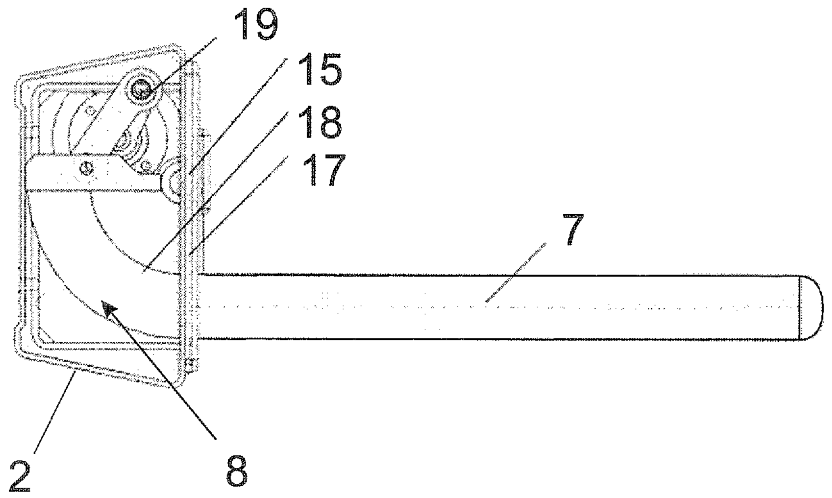
FIG. 6 shows a cross section of the gear box on the lane closed position.
Figure 7:
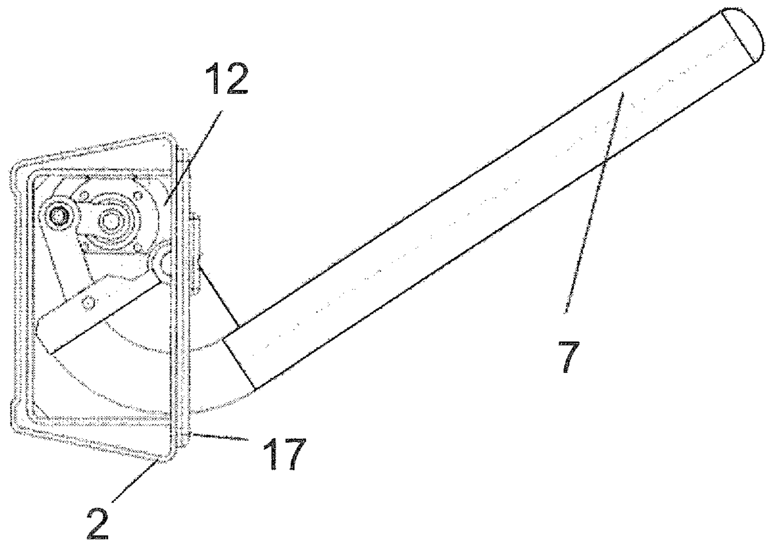
FIG. 7 shows the intermediate position between closed and open.

On the second radial end of the lever 18 a crank drive 19 is connected, which is driven by a motor 12. The crank drive 19 is positioned near to the lower dead point in the flap closed position. This drive allows an optimum in flap speed (slow acceleration and deceleration at the end of movement) and a high brake moment in the end positions. FIG. 6 shows a cross section of the gear box 8 on the lane closed position, FIG. 7 the intermediate position between closed and open.

FIGS. 8 to 13 show another version of an access control gate. This version differs from the versions in FIGS. 3 and 4 according to the fact that both detecting beams 22, 23 are arranged on one of the two supports 2, whereby detecting beam 22 lies in the plain through gate threshold 4 and detecting beam 23 is directed forwards in an angle of 25° to the gate threshold 4, said detecting beams 22, 23 together defining a detection zone 25.

Figure 8:
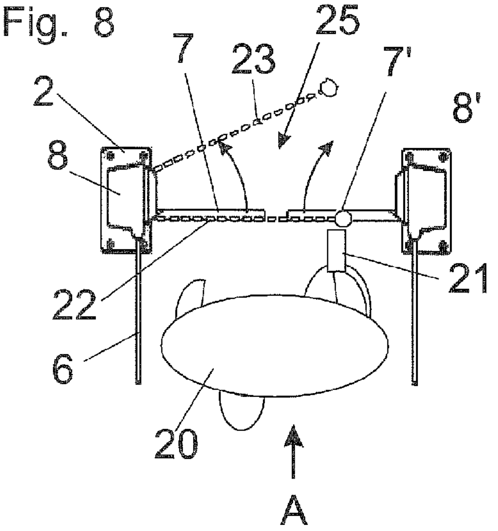
FIG. 8 shows, similar to FIG. 3 at the right side, a schematic top view of a second embodiment of an access control gate.
Figure 9:
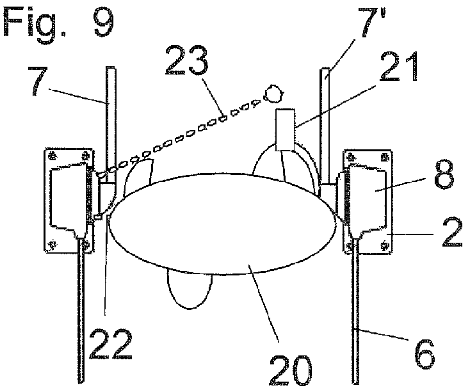
FIG. 9 shows the gate of FIG. 8, where a patron passes the gate threshold.
Figure 10:
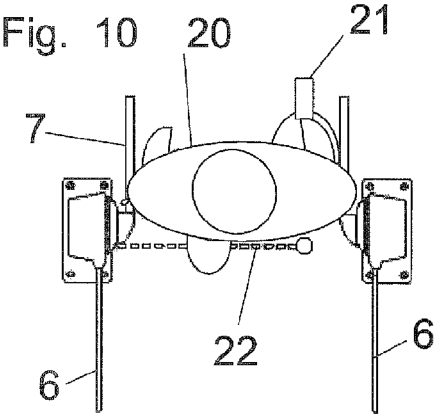
FIG. 10 shows the gate of FIG. 8, where the patron has moved forward between the detecting beams.

FIG. 8 shows a situation, in which the patron 20 approaches gate threshold 4 and in which RFID-ticket or chip card 21 is arranged in the reading zone, so that the flaps 7, 7' unblock the passage with high speed. When the patron 20 passes according to FIGS. 9, 10 and 11, firstly detecting beam 22 functioning as presence or entrance sensor into the detecting zone 25 and then detecting beam 23 functioning as an exit sensor are interrupted and, secondly, freed again subsequently. This is the requirement, so that the two flaps 7, 7' can be closed with high speed after leaving the detecting zone 25 (as shown in FIG. 11) to block the passage as fast as possible.

Figure 12:
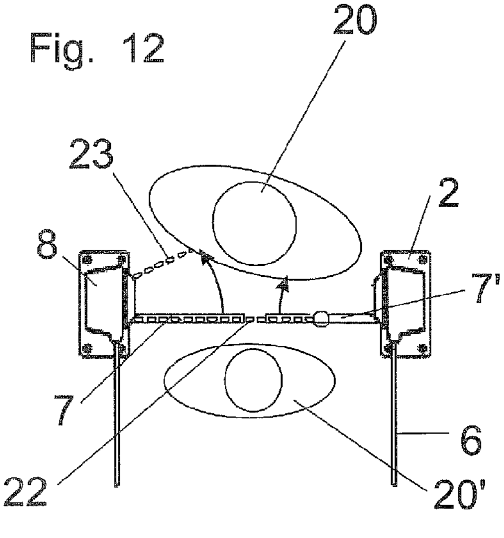
FIG. 12 shows the gate of FIG. 8 in a situation to initiate a safety operation program.

FIG. 12 shows a situation, in which a safety operation program of the gate control goes into action, which reduces the opening speed of the flaps 7, 7'. It is shown that patron 20—for example mother or father of the succeeding child 20'—has already released both detecting beams 22, 23, so that the flaps 7, 7' are closed according to FIG. 7, but has afterwards gone back so far that detecting beam 23 is again interrupted. The succeeding child 20' naturally interrupts detecting beam 22 afterwards and gate control unit 14 receives an opening signal. As detecting beam 23 is interrupted, the safety operation program starts and opens the flaps 7, 7' with low speed, so that an impact of the flaps 7, 7' on patron 20 is avoided.

If an irregular procedure occurs, for example at an interruption of one of the detecting beams 22, 23 by object 24 for over three seconds, gate control unit 14 starts a first irregular operation program, which delays closing of the gate. The open flaps 7, 7' will be closed with low speed to avoid damage or violation of the reason or cause of the interruption (object 24) not until a preset time-out period has elapsed. This time-out period may last five seconds, e.g.

Figure 11:
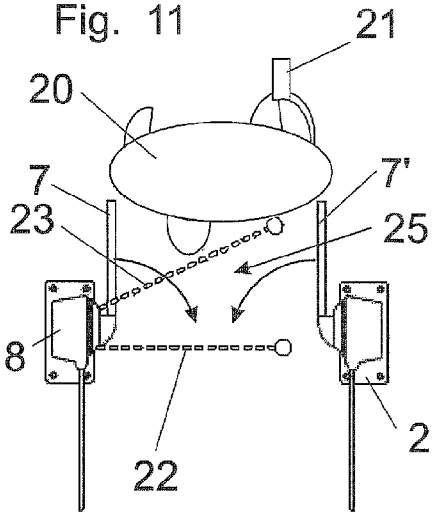
FIG. 11 shows the gate of FIG. 8, where the patron has left the access control gate.
Figure 13:
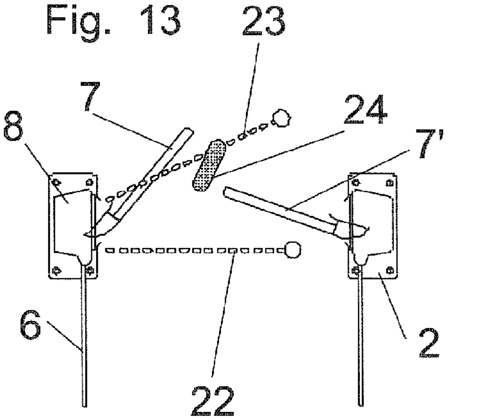
FIG. 13 shows the gate of FIG. 8 in a situation to initiate an irregular operation program.

FIG. 13 finally shows a situation, in which flap 7 is blocked during the closing movement by a schematic object 24, e.g. an object carried by the patron who already has passed the gate (like FIG. 11). By means of a position sensor, which is not shown, a blocked intermediate position of the flaps 7, 7' is detected and a second irregular operation program starts: the closing movement of the flaps is interrupted, both flaps 7, 7' are fully opened again, and the gate is closed with a non-synchronic movement of the left and right flap to prevent wedging of object 24.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed:

1. A mechanically guided access control gate for an access lane for patrons, comprising:

two motor driven flaps which protrude from left and right of lateral lane boundaries into the access lane so as to form a closable gate defining a gate threshold;

an electronic gate control unit for controlling the motor driven flaps and configured to receive an opening signal from a verification system; and a detector system connected to the electronic gate control unit and comprising two or more photoelectric barriers having first and second spaced detecting beams detecting a passage of a patron through the gate, the first detecting beam forming a presence sensor at the gate threshold and the second detecting beam forming an exit sensor behind the gate threshold, wherein the electronic gate control unit uses a regular operation program to provide power to the motor driven flaps in response to the opening signal and to drive the flaps with maximum speed between the open and closed position and vice versa, said regular operation program forcing the flaps to turn out of the lane until a flap position sensor indicates a final flap open position, wherein the electronic gate control unit provides power to the motor driven flaps forcing the flaps to close immediately as soon as the first detecting beam and the second detecting beam have been blocked and released by the patron, and wherein the electronic gate control unit contains a safety operation program which is initiated when the second detecting beam is blocked and an opening signal to the electronic gate control unit arrives, whereupon the safety operation program reduces the opening speed of the flaps to a slower safety speed.

2. A mechanically guided access control gate for an access lane for patrons, comprising:

two motor driven flaps which protrude from left and right of lateral lane boundaries into the access lane so as to form a closable gate defining a gate threshold;

an electronic gate control unit for controlling the motor driven flaps and configured to receive an opening signal from a verification system; and a detector system connected to the electronic gate control unit and comprising two or more photoelectric barriers having first and second spaced detecting beams detecting a passage of a patron through the gate, the first detecting beam forming a presence sensor at the gate threshold and the second detecting beam forming an exit sensor behind the gate threshold, wherein the electronic gate control unit uses a regular operation program to provide power to the motor driven flaps in response to the opening signal and to drive the flaps with maximum speed between the open and closed position and vice versa, said regular operation program forcing the flaps to turn out of the lane until a flap position sensor indicates a final flap open position, wherein the electronic gate control unit provides power to the motor driven flaps forcing the flaps to close immediately as soon as the first detecting beam and the second detecting beam have been blocked and released by the patron, and wherein the electronic gate control unit contains a first irregular operation program which is initiated if the first detecting beam or the second detecting beam is blocked for a longer time than regular, and the first irregular operation program initiates a time-out period followed by closing the flaps with minimum speed.

3. A mechanically guided access control gate for an access lane for patrons, comprising:

two motor driven flaps which protrude from left and right of lateral lane boundaries into the access lane so as to form a closable gate defining a gate threshold;

an electronic gate control unit for controlling the motor driven flaps and configured to receive an opening signal from a verification system; and a detector system connected to the electronic gate control unit and comprising two or more photoelectric barriers having first and second spaced detecting beams detecting a passage of a patron through the gate, the first detecting beam forming a presence sensor at the gate threshold and the second detecting beam forming an exit sensor behind the gate threshold, wherein the electronic gate control unit uses a regular operation program to provide power to the motor driven flaps in response to the opening signal, forcing the flaps to turn out of the lane until a flap position sensor indicates a final flap open position, wherein the electronic gate control unit provides power to the motor driven flaps forcing the flaps to close immediately as soon as the first detecting beam and the second detecting beam have been blocked and released by the patron, and wherein the electronic gate control unit contains a second irregular operation program which is initiated in response to the flap position sensor recognising an external blocking of the regular synchronous moving cycle during a closing of the flaps, whereupon the second irregular operation program stops the closing movement, reopens the flaps, and closes the gate again with a non-synchronous movement of the left and the right flap.

* * * * *